(12) United States Patent
Renkes et al.

(10) Patent No.: US 7,888,439 B2
(45) Date of Patent: Feb. 15, 2011

(54) PROCESS FOR THE PRODUCTION OF AQUEOUS BINDER LATICES

(75) Inventors: Tanja Renkes, Duisburg (DE); Frank Tessari, Wuppertal (DE); Matthieu Barrere, Duesseldorf (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 37 days.

(21) Appl. No.: 12/532,730

(22) PCT Filed: Apr. 7, 2008

(86) PCT No.: PCT/US2008/004520

§ 371 (c)(1),
(2), (4) Date: Sep. 23, 2009

(87) PCT Pub. No.: WO2008/124137

PCT Pub. Date: Oct. 16, 2008

(65) Prior Publication Data

US 2010/0130680 A1    May 27, 2010

(30) Foreign Application Priority Data

Apr. 5, 2007 (EP) ................... 07007150

(51) Int. Cl.
| | |
|---|---|
| C08F 265/00 | (2006.01) |
| C08F 291/00 | (2006.01) |
| C08F 2/22 | (2006.01) |
| C08F 265/02 | (2006.01) |
| C08L 51/00 | (2006.01) |
| C09D 151/00 | (2006.01) |

(52) U.S. Cl. ............... 526/201; 525/330.2; 524/460
(58) Field of Classification Search ............ 526/201; 525/330.2; 524/460
See application file for complete search history.

(56) References Cited

U.S. PATENT DOCUMENTS 4,876,313 A * 10/1989 Lorah ............ 525/281

FOREIGN PATENT DOCUMENTS

EP  1008635 A1 * 6/2000
WO  WO2006/118974 A1  11/2006

OTHER PUBLICATIONS

T. Brock, M. Groteklaes and P. Mischke, European Coatings Handbook, 2000, Curt R. Vincentz Verlag, Hannover, pp. 43-44.

* cited by examiner

*Primary Examiner*—Kelechi C Egwim
(74) *Attorney, Agent, or Firm*—Sudhir G. Desbmukh

(57) ABSTRACT

A process for the production of aqueous binder latices by multistage emulsion polymerization in the aqueous phase, comprising the successive steps:

1) free-radical polymerization of a monomer mixture A comprising acidic monomers in a proportion corresponding to an acid value of 10 to 100 mg of KOH/g and olefinically polyunsaturated monomers in a proportion of 0.5 to 5 wt %,
2) neutralization of acid groups of the polymer formed in process step 1) and
3) free-radical polymerization of at least one monomer mixture B comprising acidic monomers in a proportion corresponding to an acid value of mixture(s) B of 0 to below 5 mg of KOH/g, hydroxyl-functional monomers in a proportion corresponding to a hydroxyl value of mixture(s) B of 0 to below 5 mg of KOH/g and olefinically polyunsaturated monomers in a proportion of 0.5 to 5 wt %, wherein the monomer composition of mixtures A and B is selected in such a manner that the calculated glass transition temperature (Tg) of a copolymer composed of a combination of only the olefinically monounsaturated monomers of mixtures A and B is in the range from 30 to 100° C., wherein the ratio by weight of mixture A to the at least one mixture B is from 15:85 to 85:15 and wherein neutralization is not begun in process step 2) until at least 90 wt. % of the monomers of mixture A have been polymerized to completion.

11 Claims, No Drawings

PROCESS FOR THE PRODUCTION OF AQUEOUS BINDER LATICES

FIELD OF THE INVENTION

The present invention relates to a process for the production of aqueous binder latices, to the aqueous binder latices produced using the process and also to use thereof as binders in aqueous coating compositions.

BACKGROUND OF THE INVENTION

WO 2006/118974 discloses aqueous binder latices which are particularly suitable as binders in water-borne base coats useful in the production of base coat/clear coat two-layer coatings. The aqueous binder latices are produced by multistage emulsion polymerization; olefinically polyunsaturated monomers are copolymerized in all the stages of the emulsion polymerization and olefinically monounsaturated monomers with acid groups are copolymerized in the first stage of the emulsion polymerization. After completion of the first stage of the emulsion polymerization, the acid groups are neutralized.

Surprisingly, the color purity of pigmented coating compositions formulated with the aqueous binder latices disclosed in WO 2006/118974 and of coatings applied from said coating compositions can be improved, if the monomer composition of the monomer mixtures employed during the preparation of those aqueous binder latices is selected in such a manner that the calculated glass transition temperature (Tg) of a copolymer composed of a combination of only the olefinically monounsaturated monomers of the monomer mixtures is in the range from 30 to 100° C. For example, in case of non-chromatic color shades such as white or silver-metallic color shades improved color purity means that those color shades show less undertone. The effect of showing less undertone can be perceived by the human eye and can also be determined colorimetrically; the colors are closer to the L* axis, i.e. the absolute values of a* and/or b* are smaller (brightness L*, red-green value a* and yellow-blue value b* according to the CIELab system, see DIN 6174). In case of black solid colors (black single-tone color shades) as well as black effect colors (black color shades having a pigment content comprising at least one special effect-imparting pigment) improved color purity means that those color shades show less yellowness or a higher so-called jetness (degree of blackness). Furthermore, in case of colored shades, in particular colored effect shades, such as colored effect shades having pigment contents comprising special effect pigments (metal pigments, mica pigments, etc.) improved color purity means a higher saturation of chroma C* (chroma C* according to the CIELab system, see DIN 6174), which can also be perceived by the human eye.

Color capability can be improved with the aqueous binder latices according to the invention. In other words, if the aqueous binder latices according to the invention are used, a better access becomes available to color shades that were difficult or even impossible to achieve when formulating aqueous coating compositions with the aqueous binder latices disclosed in WO 2006/118974.

SUMMARY OF THE INVENTION

The invention relates to a process for the production of aqueous binder latices by multistage emulsion polymerization in the aqueous phase, comprising the successive steps:

1) free-radical polymerization of a mixture A of olefinically unsaturated, free-radically polymerizable monomers, comprising at least one olefinically monounsaturated monomer with at least one acid group in a proportion corresponding to an acid value of mixture A of 10 to 100 mg of KOH/g and 0.5 to 5 wt. % of at least one olefinically polyunsaturated monomer, in the aqueous phase,
2) neutralization of acid groups of the polymer formed in process step 1) and
3) free-radical polymerization of at least one mixture B of olefinically unsaturated, free-radically polymerizable monomers, comprising at least one olefinically monounsaturated monomer with at least one acid group in a proportion corresponding to an acid value of mixture B or each of the mixtures B of 0 to below 5 mg of KOH/g, at least one olefinically monounsaturated monomer with at least one hydroxyl group in a proportion corresponding to a hydroxyl value of mixture B or each of the mixtures B of 0 to below 5 mg of KOH/g and at least one olefinically polyunsaturated monomer in a proportion of 0.5 to 5 wt. %, relative to mixture B or each of the mixtures B, in the presence of the product obtained in process step 2), wherein the monomer composition of mixtures A and B is selected in such a manner that the calculated glass transition temperature (Tg) of a copolymer composed of a combination of only the olefinically monounsaturated monomers of mixtures A and B is in the range from 30 to 100° C., wherein the ratio by weight of mixture A to the at least one mixture B is from 15:85 to 85:15 and wherein neutralization is not begun in process step 2) until at least 90 wt. % of the monomers of mixture A have been polymerized to completion.

By "aqueous binder latices", it is meant water-dispersed emulsion polymers, i.e. water-dispersed polymer particles prepared by emulsion polymerizing free-radically polymerizable olefinically unsaturated monomers, said emulsion polymers being usable as film-forming binders in water-borne coating compositions, particularly in water-borne base coats of base coat/clear coat finishes.

DETAILED DESCRIPTION OF THE EMBODIMENTS

The term "calculated glass transition temperature" is used in the description and the claims. It refers to the glass transition temperature (Tg) calculated according to the well-known Fox equation (see, for example, T. Brock, M. Groteklaes and P. Mischke, European Coatings Handbook, 2000, Curt R. Vincentz Verlag, Hannover, pages 43-44; Tg values for homopolymers see, for example, Polymer Handbook, 3rd Edition, 1989, J. Wiley & Sons, New York, page VI-209 and the following).

In the process according to the invention, aqueous binder latices are produced by a multistage, preferably two-stage emulsion polymerization, i.e. the mixtures A and B of olefinically unsaturated monomers to be free-radically polymerized are polymerized under conventional conditions known to the person skilled in the art of a free-radical polymerization performed in an aqueous emulsion, i.e. using one or more emulsifiers and with the addition of one or more initiators which are thermally dissociable into free radicals. In order to ensure the formation of a crosslinked or even gel structure in the polymer products formed in each stage of the emulsion polymerization, olefinically polyunsaturated monomers are used and copolymerized in each stage of the emulsion polymerization. The duration of the emulsion polymerization (time taken to apportion mixtures A and B into the aqueous initial charge plus the duration of the neutralization operation of process step 2) plus the duration of the post-polymerization phase) is, for example, 1 to 10 hours. The polymerization temperature in the aqueous phase is, for example, 50 to 95° C.

The emulsifier(s) is/are used in a conventional total quantity of, for example, 0.1 to 3 wt. %, relative to the sum of the weights of mixtures A and B and may be initially introduced and/or added as a constituent of the mixtures A and B and/or added in parallel to the apportionment of mixtures A and B. Examples of usable emulsifiers are the conventional cationic, anionic and nonionic emulsifiers usable in the context of emulsion polymerization, such as, for example, cetyltrimethylammonium chloride, benzyldodecyldimethylammonium bromide, sodium dodecyl sulfate, sodium dodecylbenzenesulfonate, polyethylene glycol monolauryl ether. Care must be taken to ensure that cationic and anionic emulsifiers are not used with one another.

The initiator(s) which are thermally dissociable into free radicals (free-radical initiators) are used in a conventional total quantity of, for example, 0.02 to 2 wt. %, relative to the sum of the weights of mixtures A and B and may be added contemporaneously to the apportionment of mixtures A and B. The water-soluble free-radical initiator(s) may be added as such, as a constituent of mixtures A and B, but in particular as an aqueous solution. A proportion of the free-radical initiator(s) may, however, be initially introduced and/or added once addition of the monomers is complete. It is also possible to add the initiator(s) completely prior to the apportionment of mixtures A and B. The free-radical initiator(s) are preferably water-soluble. Examples of usable free-radical initiators are hydrogen peroxide, peroxodisulfates such as sodium, potassium and ammonium peroxodisulfate, ammonium salts of 4,4'-azobis(4-cyanopentanoic acid), 2,2'-azobis(2-methyl-N-1,1-bis(hydroxymethyl)ethyl)propionamide, 2,2'-azobis(2-methyl-N-2-hydroxyethyl)propionamide as well as conventional redox initiator systems known to the person skilled in the art, such as hydrogen peroxide/ascorbic acid optionally in combination with catalytic metal salts such as iron, copper or chromium salts.

The monomer mixtures A and B to be free-radically polymerized according to process steps 1) and 3) are apportioned, i.e. added, as is usual in emulsion polymerizations, into an aqueous initial charge, which has generally already been adjusted to the polymerization temperature. Process steps 1) and 3) consequently comprise the apportionment of mixtures A and B and are started by the beginning of the particular apportionment. Mixtures A and B are apportioned one after the other according to successive process steps 1) and 3), wherein apportionment of the one or more mixtures B is begun with process step 3), but at the earliest after completion of process step 2), i.e. at the earliest once at least 90 wt. % of the monomers of mixture A have been polymerized to completion and the neutralization according to process step 2) has been performed. The extent to which the polymerization has been taken to completion may readily be determined by determining the solids content. Apportionment of the at least one mixture B into the aqueous initial charge may thus begin at the earliest after apportionment of 90% of mixture A and the subsequent addition of the neutralizing agent in process step 2), which corresponds to the case of a very high rate of polymerization with virtually instantaneous 100% polymerization conversion. In general, however, mixture A) is initially apportioned in its entirety during process step 1), after which the neutralizing agent is added in process step 2) once the mixture A) monomers have been at least 90%, preferably completely, polymerized and only thereafter, during process step 3), is the at least one mixture B apportioned.

The acid groups of the polymer obtained in process step 1) are neutralized using conventional basic neutralizing agents, such as ammonia and in particular amines and/or aminoalcohols such as, for example, triethylamine, dimethylisopropylamine, dimethylethanolamine, dimethylisopropanolamine and 2-amino-2-methyl-1-propanol.

The basic neutralizing agents are added in accordance with a degree of neutralization of, for example, 10 to 100%. A degree of neutralization of 100% here corresponds to a stoichiometric neutralization of each acid group in the polymer arising from mixture A. For example, the degree of neutralization is selected dependent on the solids content of the aqueous binder latex obtained after completion of the process according to the invention and also dependent on the acid value of mixture A. In general, a low degree of neutralization is selected in the case of elevated acid values and an elevated solids content and vice versa.

The term "mixture" used in connection with mixtures A and B does not exclude separate apportionment of the particular monomers, i.e. the monomers may also be apportioned individually or as two or more different mixtures of only some of the monomers. It is preferred, however, to apportion real mixtures A and B. Mixtures A and B may also be apportioned in the form of preemulsions.

The ratio by weight of mixture A to the at least one mixture B is 15:85 to 85:15.

Mixture A comprises at least one olefinically monounsaturated, free-radically polymerizable monomer with at least one acid group in a proportion corresponding to an acid value of mixture A of 10 to 100 mg of KOH/g, for example, a wt. % proportion of above 1 to 20 wt. %, in particular of above 1 to 10 wt. % of at least one olefinically monounsaturated, free-radically polymerizable monomer with at least one acid group.

Examples of olefinically monounsaturated, free-radically polymerizable monomers with at least one acid group are in particular olefinically monounsaturated monomers containing carboxyl groups, such as, for example, (meth)acrylic, itaconic, crotonic, isocrotonic, aconitic, maleic and fumaric acid, semi-esters of maleic and fumaric acid and carboxyalkyl esters of (meth)acrylic acid, for example, beta-carboxyethyl acrylate and adducts of hydroxyalkyl (meth)acrylates with carboxylic anhydrides, such as, for example, phthalic acid mono-2-(meth)acryloyloxyethyl ester. (Meth)acrylic acid is preferred.

The term "(meth)acrylic" is used in the present description and the claims. This means acrylic and/or methacrylic.

Mixture A further comprises 0.5 to 5 wt. %, preferably 0.5 to 3 wt. % of at least one olefinically polyunsaturated, free-radically polymerizable monomer.

Examples of olefinically polyunsaturated, free-radically polymerizable monomers are divinylbenzene, hexanediol di(meth)acrylate, ethylene and propylene glycol di(meth)acrylate, 1,3- and 1,4-butanediol di(meth)acrylate, vinyl (meth)acrylate, allyl (meth)acrylate, diallyl phthalate, glycerol tri(meth)acrylate, trimethylolpropane tri(meth)acrylate, pentaerythritol tetra(meth)acrylate, di- and tripropylene glycol di(meth)acrylate, hexamethylene bis(meth)acrylamide. Further examples are compounds which may be produced by a condensation or preferably by an addition reaction of complementary compounds, which in each case, in addition to one or more olefinic double bonds, contain one or more further functional groups per molecule. The further functional groups of the individual complementary compounds comprise pairs of mutually complementary reactive groups, in particular groups which are capable of reacting with one another for the purposes of a possible condensation or addition reaction.

Examples of olefinically polyunsaturated, free-radically polymerizable monomers produced by a condensation reaction are reaction products formed from alkoxysilane-functional (meth)acrylic monomers after hydrolysis with elimination of alcohol and formation of siloxane bridges. Further examples are reaction products formed from hydroxyalkyl (meth)acrylates and olefinically unsaturated isocyanates blocked on the isocyanate group, such as isocyanatoalkyl (meth)acrylate or m-isopropenyl-alpha,alpha-dimethylbenzyl isocyanate with elimination of the blocking agent and formation of urethane groups.

Examples of olefinically polyunsaturated, free-radically polymerizable monomers produced by an addition reaction are addition products formed from hydroxyalkyl (meth)acrylates and olefinically unsaturated isocyanates, such as isocyanatoalkyl (meth)acrylate or m-isopropenyl-alpha,alpha-dimethylbenzyl isocyanate with formation of a urethane group or reaction products formed by ring-opening addition of the epoxy group of unsaturated epoxy compounds onto the carboxyl group of an unsaturated acid with formation of an ester group and a hydroxyl group, such as, for example, the addition product formed from glycidyl (meth)acrylate and (meth)acrylic acid.

Apart from the at least one olefinically monounsaturated, free-radically polymerizable monomer with at least one acid group and the at least one olefinically polyunsaturated, free-radically polymerizable monomer, mixture A also comprises one or more further olefinically monounsaturated, free-radically polymerizable monomers. These may comprise functional groups or they may be non-functionalized and they may also be used in combination.

Examples of olefinically monounsaturated, free-radically polymerizable monomers without functional groups usable in mixture A are monovinyl aromatic compounds such as styrene, vinyltoluene; vinyl ethers and vinyl esters, such as vinyl acetate, vinyl versatate; maleic, fumaric, tetrahydrophthalic acid dialkyl esters; but in particular (cyclo)alkyl (meth)acrylates, such as methyl (meth)acrylate, ethyl (meth)acrylate, propyl (meth)acrylate, butyl (meth)acrylate, isobutyl (meth)acrylate, tert.-butyl (meth)acrylate, hexyl (meth)acrylate, cyclohexyl (meth)acrylate, ethylhexyl (meth)acrylate, decyl (meth)acrylate, dodecyl (meth)acrylate, hexadecyl (meth)acrylate, lauryl (meth)acrylate and isobornyl (meth)acrylate.

Examples of olefinically monounsaturated, free-radically polymerizable monomers with functional groups usable in mixture A are in particular olefinically monounsaturated monomers with at least one hydroxyl group, such as allyl alcohol, but in particular hydroxyalkyl (meth)acrylates such as, for example, hydroxyethyl (meth)acrylate, and the hydroxypropyl (meth)acrylates, hydroxybutyl (meth)acrylates isomeric with regard to the position of the hydroxyl group. Further examples are glycerol mono(meth)acrylate, adducts of (meth)acrylic acid onto monoepoxides, such as, for example, versatic acid glycidyl ester and adducts of glycidyl (meth)acrylate onto monocarboxylic acids such as, for example, acetic acid or propionic acid.

If mixture A comprises at least one olefinically monounsaturated, free-radically polymerizable monomer with at least one hydroxyl group, which may be advantageous, the proportion thereof in mixture A lie(s) in a range corresponding to a hydroxyl value of mixture A of below 60 mg of KOH/g, in particular of 5 to 30 mg of KOH/g.

The description and the claims mention at least one mixture B. If more than one mixture B is used, these may be apportioned simultaneously or successively. Preferably, only a single mixture B is used, in which case the process according to the invention is a two-stage emulsion polymerization, in which mixture A is polymerized in process step 1) and mixture B is polymerized in process step 3).

The preferably only one, or in the case of two or more mixtures B, each of the mixtures B comprises at least one olefinically monounsaturated, free-radically polymerizable monomer with at least one acid group in a proportion corresponding to an acid value of the mixture of 0 to below 5 mg of KOH/g, at least one olefinically monounsaturated, free-radically polymerizable monomer with at least one hydroxyl group in a proportion corresponding to a hydroxyl value of the mixture of 0 to below 5 mg of KOH/g, and 0.5 to 5 wt. %, preferably 0.5 to 3 wt. % of at least one olefinically polyunsaturated, free-radically polymerizable monomer. Mixture B or the mixtures B preferably comprise neither olefinically monounsaturated, free-radically polymerizable monomers with at least one acid group nor olefinically monounsaturated, free-radically polymerizable monomers with at least one hydroxyl group.

Examples of olefinically monounsaturated, free-radically polymerizable monomers with at least one acid group or with at least one hydroxyl group and of olefinically polyunsaturated, free-radically polymerizable monomers are the same as those described in connection with mixture A.

Apart from the at least one olefinically polyunsaturated, free-radically polymerizable monomer and the possible, but preferably absent, olefinically monounsaturated, free-radically polymerizable monomer with at least one acid group or with at least one hydroxyl group, the at least one mixture B comprises at least one further olefinically monounsaturated, free-radically polymerizable monomer without functional groups. Examples of such non-functionalized olefinically monounsaturated, free-radically polymerizable monomers are the same as those described in connection with mixture A.

The monomer composition of mixtures A and B is selected in such a manner that the calculated glass transition temperature (Tg) of a copolymer composed of a combination of only the olefinically monounsaturated monomers of mixtures A and B is in the range from 30 to 100° C.

In a first preferred embodiment of the process according to the invention mixture A or the at least one mixture B or mixture A and the at least one mixture B comprise at least one epoxy-functional, olefinically monounsaturated, free-radically polymerizable monomer in a total proportion of 2 to 20 wt.-% relative to the sum of the weights of mixtures A and B. Examples of usable olefinically monounsaturated, free-radically polymerizable monomers with at least one epoxide group comprise glycidyl (meth)acrylate, allyl glycidylether, methallyl glycidylether, 3,4-epoxy-1-vinylcyclohexane, epoxycyclohexyl (meth)acrylate, vinyl glycidylether. Glycidyl (meth)acrylate is preferred.

In a second preferred embodiment of the process according to the invention mixture A or the at least one mixture B or mixture A and the at least one mixture B comprise at least one olefinically monounsaturated, free-radically polymerizable monomer having at least one aromatic hydrocarbon moiety in the molecule (in the following also called "aromatic monomer" for brevity purposes). The at least one aromatic monomer constitutes 10 to 50 wt.-% of the sum of the weights of mixtures A and B. Examples of usable aromatic monomers comprise benzyl (meth)acrylate, 2-benzylethyl (meth)acrylate and monovinyl aromatic monomers, such as, alphamethyl styrene, t-butyl-styrene, vinyl toluene and styrene. Styrene is preferred.

In a third preferred embodiment of the process according to the invention the features of the first and the second embodiment of the process according to the invention are combined. I.e., a combination of mixture A and the at least one mixture B comprises at least one epoxy-functional, olefinically monounsaturated, free-radically polymerizable monomer in a total proportion of 2 to 20 wt.-% and at least one aromatic monomer in a total proportion of 10 to 50 wt.-%, wherein the wt.-% in each case relate to the sum of the weights of mixtures A and B. Any one of the at least one epoxy-functional, olefinically monounsaturated, free-radically polymerizable monomer and the at least one aromatic monomer may be, independently of each other, constituent of mixture A, of the at least one mixture B or of mixture A as well as of the at least one mixture B.

The process according to the invention permits the production of aqueous binder latices with solids contents of, for example, 30 to 60 wt. %.

Using the aqueous binder latices according to the invention, it is possible to formulate aqueous coating compositions which are distinguished by particular rheological properties. In practice, the aqueous coating compositions are distinguished by excellent sagging properties, i.e. by a low tendency to sag. If the aqueous coating compositions are coating compositions comprising special effect pigments (effect flake pigments), these compositions are distinguished by excellent development of the special effect (excellent flake orientation), for example, an excellent metallic effect. The virtually complete or complete absence of a tendency towards mottling (formation of clouds) is noteworthy. Compared to the aqueous coating compositions as disclosed in WO 2006/118974 the aqueous coating compositions comprising the aqueous binder latices according to the invention exhibit an improved color purity. Same is true with regard to coatings applied from the aqueous coating compositions. Said color purity improvement is even stronger, if aqueous binder latices prepared according to a preferred embodiment of the invention are used as binders when formulating pigmented aqueous coating compositions.

For example, water-borne base coats suitable for the production of base coat/clear coat two-layer coatings may be formulated with the aqueous binder latices according to the invention.

Water-borne base coats are produced by mixing pigments with the aqueous binder latices according to the invention and with the following in each case optional constituents: further binders, crosslinking agents, fillers (extenders), conventional coating additives and organic solvents.

The water-borne base coats have solids contents of, for example, 10 to 45 wt. %, preferably of 15 to 35 wt. %. The ratio by weight of pigment content to the resin solids content is, for example, from 0.05:1 to 2:1, for special-effect water-borne base coats it is, for example, preferably 0.06:1 to 0.6:1, for solid color (single-tone) water-borne base coats it is preferably higher, for example, 0.06:1 to 2:1, in each case relative to the weight of solids. Apart from water, at least one pigment, the resin solids content, which comprises at least one binder introduced by an aqueous binder latex according to the invention, optionally one or more further binders differing therefrom and optionally one or more crosslinking agents, optionally one or more fillers and optionally one or more organic solvents, the water-borne base coats in general also comprise one or more conventional coating additives. The at least one binder introduced by an aqueous binder latex according to the invention and the optional further binders differing therefrom form the binder solids content. The phrase "optionally further binders differing therefrom" includes not only binder resins but also pigment grinding resins. The binder introduced by an aqueous binder latex according to the invention may be the sole binder. If, in addition to the at least one binder introduced by an aqueous binder latex according to the invention, further binders differing therefrom are also present, the proportion thereof in the binder solids content is, for example, 20 to 80 wt. %.

Examples of binders differing from the binders introduced by an aqueous binder latex according to the invention are conventional film-forming, water-dilutable binders familiar to the person skilled in the art, such as water-dilutable polyester resins, water-dilutable (meth)acrylic copolymer resins or water-dilutable polyester/(meth)acrylic copolymer hybrids and water-dilutable polyurethane resins or polyurethane/(meth)acrylic copolymer hybrids. These may be reactive or non-functional resins.

The water-borne base coats may be self drying (physically drying), self crosslinking or externally crosslinking. Accordingly, the water-borne base coats may comprise crosslinking agents, such as, for example, free or blocked polyisocyanates or amino resins, for example, melamine resins. Selection of the optionally used crosslinking agents depends on the type of crosslinkable groups in the binders and is familiar to the person skilled in the art. The crosslinking agents may be used individually or in combination. The mixing ratio of crosslinking agent solids to binder solids amounts, for example, to 10:90 to 40:60, preferably 20:80 to 30:70.

The water-borne base coats comprise conventional coating pigments, for example, special effect pigments and/or pigments selected from among white, colored and black pigments.

Examples of special effect pigments are conventional pigments which impart to a coating a color and/or lightness flop dependent on the angle of observation, such as metal pigments, for example, made from aluminum, copper or other metals, interference pigments such as, for example, metal oxide coated metal pigments, for example, iron oxide coated aluminum, coated mica such as, for example, titanium dioxide coated mica, pigments which produce a graphite effect, iron oxide in flake form, liquid crystal pigments, coated aluminum oxide pigments, coated silicon dioxide pigments.

Examples of white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, perylene pigments.

The water-borne base coats may also comprise fillers, for example, in proportions of 0 to 30 wt. % relative to the resin solids content. Fillers do not constitute part of the pigment content. Examples are barium sulfate, kaolin, talcum, silicon dioxide, layered silicates.

Special effect pigments are in general initially introduced in the form of a conventional commercial aqueous or non-aqueous paste, optionally combined with preferably water-dilutable organic solvents and additives and then mixed with aqueous binder. Pulverulent special-effect pigments may first be processed with preferably water-dilutable organic solvents and additives to yield a paste.

White, colored and black pigments and/or fillers may, for example, be ground in a proportion of the aqueous binder. Grinding may preferably also take place in a special water-dilutable paste resin. The formulation is then made up with the remaining proportion of the aqueous binder or of the aqueous paste resin.

The water-borne base coats may comprise conventional coating additives in conventional quantities, for example, of 0.1 to 5 wt. %, relative to the solids content thereof. Examples are neutralizing agents, antifoaming agents, wetting agents, adhesion promoters, catalysts, levelling agents, anticratering agents, thickeners and light stabilizers.

The water-borne base coats may comprise conventional coating solvents, for example, in a proportion of preferably less than 20 wt. %, particularly preferably of less than 15 wt. %. These are conventional coating solvents, which may originate, for example, from the production of the binders or are added separately. Examples of such solvents are mono- or polyhydric alcohols, for example, propanol, butanol, hexanol; glycol ethers or esters, for example, diethylene glycol dialkyl ether, dipropylene glycol dialkyl ether, in each case with C1-6 alkyl, ethoxypropanol, ethylene glycol monobutyl ether; glycols, for example, ethylene glycol, propylene glycol and the oligomers thereof; N-alkylpyrrolidones, such as, for example, N-methylpyrrolidone; ketones such as methyl ethyl ketone, acetone, cyclohexanone and aromatic or aliphatic hydrocarbons.

The water-borne base coats may be used for the production of the color- and/or special effect-imparting coating layer within a base coat/clear coat two-layer coating. The water-borne base coats may be applied by conventional methods. They are preferably applied by spraying to a dry film thickness of, for example, 8 to 40 μm; for special-effect water-borne base coats the dry film thickness is, for example, 8 to 25 μm, while for solid color water-borne base coats it is preferably greater, for example, 10 to 40 μm. Application preferably proceeds by the wet-on-wet process, i.e. after a flash-off phase, for example, at 20 to 80° C., the water-borne base coat layers are overcoated with a clear coat to a dry film thickness of preferably 30 to 60 μm and dried or crosslinked together with the latter at temperatures of, for example, 20 to 150° C. Drying conditions are determined by the clear coat system used. Temperatures of 20 to 80° C. are, for example, preferred for repair purposes. For the purposes of mass-production coating, temperatures of above 100° C., for example, of above 110° C., are preferred.

All known clear coats are in principle suitable as the clear coat. Usable clear coats are here both solvent-containing one-component (1 pack) or two-component (2 pack) clear coats, water-dilutable 1 pack or 2 pack clear coats, powder clear coats or aqueous powder clear coat slurries.

Multilayer coatings produced in this manner may be applied onto various types of substrate. The substrates are generally of metal or of plastics. These are often precoated, i.e. plastics substrates may, for example, be provided with a plastics primer, metallic substrates generally have an electrophoretically applied primer and optionally additionally one or more further coating layers, such as, for example, a primer surfacer layer (filler layer). These layers are in general cured.

Multilayer coatings obtained with the water-borne base coats meet conventional present-day requirements placed upon automotive coatings. The water-borne base coats are accordingly suitable for original and repair vehicle coating, but may, however, also be used in other sectors, for example, plastics coating, in particular vehicle part coating.

EXAMPLES

Examples 1-7

Preparation of Aqueous Binder Latices

A reactor was charged with 688 pbw (parts by weight) of deionized water and 16 pbw of Rhodapex EST30 (anionic surfactant available from Rhodia; 30 wt. % in water). The water and surfactant charge was heated to 80° C. under nitrogen atmosphere and held at that temperature throughout the reaction. A first stirred monomer emulsion consisting of the ingredients listed in Table 1 was prepared separately. A solution of 3.2 pbw of ammonium peroxodisulfate (APS) in 100 pbw of deionized water was added to the reactor content and the first monomer emulsion was then added within 90 minutes to the reactor content. After all of the first monomer emulsion was in, the reactor content was held for an additional hour at 80° C., during which a second stirred monomer emulsion consisting of the ingredients listed in Table 1 and a solution of 13 pbw of 2-amino-2-methyl-1-propanol (90 wt. % in water) in 98 pbw of deionized water were separately prepared. The aqueous 2-amino-2-methyl-1-propanol solution was added slowly to the reaction mixture and then, a solution of 1.1 pbw of ammonium peroxodisulfate (APS) in 70 pbw of deionized water was added slowly to the reactor content. The second monomer emulsion was then added within 90 minutes to the reaction content. After the addition was complete, the reactor content was held at 80° C. for an additional hour. The aqueous binder latex obtained was then cooled to room temperature.

TABLE 1

| | 1*) | 2**) | 3**) | 4**) | 5**) | 6**) | 7**) |
|---|---|---|---|---|---|---|---|
| | Ingredients of first monomer emulsion (in pbw): | | | | | | |
| Rhodapex EST30 | 45 | 45 | 45 | 45 | 45 | 45 | 45 |
| Deionized water | 349 | 349 | 349 | 349 | 349 | 349 | 349 |
| MMA | 317 | 547 | 317 | 445 | 445 | 270 | 270 |
| BA | 317 | 87 | 317 | 189 | 189 | 189 | 189 |
| STY | — | — | — | — | — | 175 | 175 |
| HEA | 36 | 36 | 36 | 36 | 36 | 36 | 36 |
| GMA | — | — | — | — | — | — | — |
| MAA | 36 | 36 | 36 | 36 | 36 | 36 | 36 |
| AMA | 7 | 7 | 7 | 7 | 7 | 7 | 7 |
| | Ingredients of second monomer emulsion (in pbw): | | | | | | |
| Rhodapex EST30 | 15 | 15 | 15 | 15 | 15 | 15 | 15 |
| Deionized water | 378 | 378 | 378 | 378 | 378 | 378 | 378 |
| MMA | 377 | 377 | 604 | 504 | 452 | 332 | 277 |
| BA | 327 | 327 | 100 | 200 | 180 | 197 | 180 |
| STY | — | — | — | — | — | 175 | 175 |
| GMA | — | — | — | — | 72 | — | 72 |
| AMA | 7 | 7 | 7 | 7 | 7 | 7 | 7 |
| Tg***) | 10 | 40 | 40 | 40 | 40 | 40 | 40 |

*)comparative example
**)according to the invention
***)glass transition temperature (° C.) calculated according to the Fox equation for a copolymer composed of a combination of only the olefinically monounsaturated monomers of the first and the second monomer emulsion.
AMA, Allyl methacrylate
BA, Butyl acrylate
GMA, Glycidyl methacrylate
HEA, Hydroxyethyl acrylate
MAA, Methacrylic acid
MMA, Methyl methacrylate
STY, Styrene

Example 8

Preparation of an Aqueous Polyurethane Binder Dispersion 1005 g of a straight-chain polyester (composed of adipic acid, isophthalic acid and hexanediol having a hydroxyl value of 102 mg KOH/g) were heated to 90° C. and 1.8 g of trimethylolpropane and 393 g of isophorone diisocyanate were added. The reaction was carried out at 90° C. until the NCO value was constant. After cooling to 60° C., a solution of 35.3 g of dimethylol propionic acid, 26.1 g triethylamine and 250 g N-methylpyrrolidone was added. After heating to 80° C., the reaction temperature was maintained until the NCO value was constant. The batch was mixed with a molar amount, based on the molar NCO-content, of deionized water, and the solution was kept at 80° C., until no more NCO was detectable. The batch was then converted into an aqueous dispersion having a solids content of 35 wt. % by adding deionized water.

Examples 9a-g

Preparation of Silver-colored Waterborne Base Coats

Silver-colored waterborne base coats 9a-g were prepared by mixing the constituents listed in Table 2. Proportions are in pbw. Table 2 also shows colorimetric data (red-green a* and yellow-blue b* values according to the CIELab system, see DIN 6174) of multi-layer coatings prepared with the waterborne base coats.

TABLE 2

| | Silver-colored waterborne base coats 9 | | | | | | |
|---|---|---|---|---|---|---|---|
| Constituents: | a*) | b**) | c**) | d**) | e**) | f**) | g**) |
| BE | 7.3 | 7.3 | 7.3 | 7.3 | 7.3 | 7.3 | 7.3 |
| Aluminum paste[1] | 5 | 5 | 5 | 5 | 5 | 5 | 5 |
| NMP | 1.6 | 1.6 | 1.6 | 1.6 | 1.6 | 1.6 | 1.6 |
| Binder dispersion of Example 8 | 10.6 | 10.6 | 10.6 | 10.6 | 10.6 | 10.6 | 10.6 |
| Deionized water | 10 | 10 | 10 | 10 | 10 | 10 | 10 |
| Aqueous binder latex of Example 1 | 13.7 | — | — | — | — | — | — |
| Aqueous binder latex of Example 2 | — | 13.7 | — | — | — | — | — |
| Aqueous binder latex of Example 3 | — | — | 13.7 | — | — | — | — |
| Aqueous binder latex of Example 4 | — | — | — | 13.7 | — | — | — |
| Aqueous binder latex of Example 5 | — | — | — | — | 13.7 | — | — |
| Aqueous binder latex of Example 6 | — | — | — | — | — | 13.7 | — |
| Aqueous binder latex of Example 7 | — | — | — | — | — | — | 13.7 |
| Deionized water | 10 | 10 | 10 | 10 | 10 | 10 | 10 |
| Layered silicate composition[2] | 10 | 10 | 10 | 10 | 10 | 10 | 10 |
| Maprenal ® MF 900[3] | 4.5 | 4.5 | 4.5 | 4.5 | 4.5 | 4.5 | 4.5 |
| Deionized water | 9 | 9 | 9 | 9 | 9 | 9 | 9 |
| Thickener[4] | 9 | 9 | 9 | 9 | 9 | 9 | 9 |
| DMEA, 10 wt. % solution in water | 2.9 | 2.9 | 2.9 | 2.9 | 2.9 | 2.9 | 2.9 |
| BuOH | 3 | 3 | 3 | 3 | 3 | 3 | 3 |
| DEGMBE | 3.4 | 3.4 | 3.4 | 3.4 | 3.4 | 3.4 | 3.4 |
| a* (15°) (units)[5] | 0.1 | 0.1 | 0.1 | 0.1 | 0.1 | 0 | 0 |
| a* (105°) (units)[5] | −0.9 | −0.9 | −0.8 | −0.9 | −0.8 | −0.7 | −0.7 |
| b* (15°) (units)[5] | 1.1 | 1 | 0.9 | 1 | 0.9 | −0.2 | −0.3 |
| b* (105°) (units)[5] | −1.8 | −1.6 | −1.7 | −1.6 | −1.5 | −0.9 | −0.8 |

*)comparative example
**)according to the invention
BE, Butoxy ethanol
BuOH, n-Butanol
DEGMBE, Diethylene glycol monobutyl ether
DMEA, Dimethylethanolamine
NMP, N-Methyl pyrrolidone
[1]Mixture of 50 pbw BE with 50 pbw Stapa Hydrolac ® WHH 2154 from Eckart.
[2]Mixture of 3 pbw Optigel ® SH from Südchemie, 3 pbw polypropylene glycol 900 and 94 pbw of deionized water.
[3]Melamine resin from Surface Specialties.
[4]Mixture of 33 pbw Viscalex HV 30 from Allied Colloids, 2.5 pbw DMEA and 64.5 pbw of deionized water.
[5]The water-borne base coats were each applied to steel test panels provided with a precoating consisting of EDC primer and primer surfacer in 14 μm dry film thickness. After flashing-off for 5 minutes at 20° C. and additional 5 minutes at 80° C. the test panels were each spray coated with a commercial two-component polyurethane clear coat in 40 μm dry film thickness and after flashing-off for 5 minutes at 20° C. baked for 20 minutes at 140° C. object temperature.
The a* and b* values at an illumination angle of 45 degrees to the perpendicular and observation angles of 15 and 105 degrees to the specular were measured with the instrument X-Rite MA 68 sold by the firm X-Rite Incorporated, Grandeville, Michigan, U.S.A. (illumination with standard illuminant D65).

Examples 10a-g

Preparation of Black Waterborne Base Coats

Black waterborne base coats 10a-g were prepared by mixing the constituents listed in Table 3. Proportions are in pbw. Table 3 also shows colorimetric data (brightness L*, red-green a* and yellow-blue b* values according to the CIELab system, see DIN 6174) of multi-layer coatings prepared with the waterborne base coats. Furthermore, Table 3 shows jetness values $M_c$ calculated from the tristimulus values X, Y, Z.

TABLE 3

| | Black waterborne base coats 10 | | | | | | |
|---|---|---|---|---|---|---|---|
| Constituents: | a*) | b**) | c**) | d**) | e**) | f**) | g**) |
| Binder dispersion of Example 8 | 15.5 | 15.5 | 15.5 | 15.5 | 15.5 | 15.5 | 15.5 |

TABLE 3-continued

| Constituents: | Black waterborne base coats 10 | | | | | | |
|---|---|---|---|---|---|---|---|
| | a*) | b**) | c**) | d**) | e**) | f**) | g**) |
| Deionized water | 10 | 10 | 10 | 10 | 10 | 10 | 10 |
| Aqueous binder latex of Example 1 | 12 | — | — | — | — | — | — |
| Aqueous binder latex of Example 2 | — | 12 | — | — | — | — | — |
| Aqueous binder latex of Example 3 | — | — | 12 | — | — | — | — |
| Aqueous binder latex of Example 4 | — | — | — | 12 | — | — | — |
| Aqueous binder latex of Example 5 | — | — | — | — | 12 | — | — |
| Aqueous binder latex of Example 6 | — | — | — | — | — | 12 | — |
| Aqueous binder latex of Example 7 | — | — | — | — | — | — | 12 |
| Deionized water | 10 | 10 | 10 | 10 | 10 | 10 | 10 |
| Cymel ® 325[1)] | 4.5 | 4.5 | 4.5 | 4.5 | 4.5 | 4.5 | 4.5 |
| Deionized water | 16 | 16 | 16 | 16 | 16 | 16 | 16 |
| Thickener[2)] | 7 | 7 | 7 | 7 | 7 | 7 | 7 |
| DMEA, 10 wt. % solution in water | 3.5 | 3.5 | 3.5 | 3.5 | 3.5 | 3.5 | 3.5 |
| Surfynol ® 104 (50 wt. % in BE)[3)] | 1.5 | 1.5 | 1.5 | 1.5 | 1.5 | 1.5 | 1.5 |
| BE | 10 | 10 | 10 | 10 | 10 | 10 | 10 |
| Carbon Black Dispersion[4)] | 10 | 10 | 10 | 10 | 10 | 10 | 10 |
| Brightness L* (units)[5)] | 2.00 | 1.85 | 1.84 | 1.89 | 1.77 | 1.45 | 1.44 |
| a* (units)[5)] | 0.01 | −0.08 | −0.08 | −0.08 | −0.26 | −0.10 | −0.12 |
| b* (units)[5)] | 0.10 | −0.10 | −0.08 | −0.15 | −0.22 | −0.31 | −0.45 |
| $M_c$ (units)[5)] | 264 | 269 | 271 | 270 | 275 | 285 | 288 |

*[)]comparative example
**[)]according to the invention
[1)]Melamine resin from Cytec.
[2)]Mixture of 33 pbw Viscalex HV 30 from Allied Colloids, 2.5 pbw DMEA and 64.5 pbw of deionized water.
[3)]Defoamer from Air Products.
[4)]Mixture of 15 pbw carbon black, 10 pbw of a nonionic surfactant, 22 pbw DMEA and 53 pbw deionized water.
[5)]The water-borne base coats were each applied to steel test panels provided with a precoating consisting of EDC primer and primer surfacer in 16 μm dry film thickness. After flashing-off for 5 minutes at 20° C. and additional 5 minutes at 80° C. the test panels were each spray coated with a commercial two-component polyurethane clear coat in 40 μm dry film thickness and after flashing-off for 5 minutes at 20° C. baked for 20 minutes at 140° C. object temperature.
The L*, a* and b* values at an illumination angle of 45 degrees to the perpendicular and observation angles of 45 degrees to the specular were measured with the instrument X-Rite MA 68 sold by the firm X-Rite Incorporated, Grandeville, Michigan, U.S.A. (illumination with standard illuminant D65). The tristimulus values X, Y, Z were obtained by the same colorimetric measurement.

The jetness value $M_c$ was calculated according to the equation:

$$M_c = 100[\log(Xn/X) - \log(Zn/Z) + \log(Yn/Y)].$$

Examples 11a-g

Preparation of Waterborne Base Coats with a Blue Mica Color Shade

Waterborne base coats 11a-g with a blue mica color shade were prepared by mixing the constituents listed in Table 4. Proportions are in pbw. Table 4 also shows colorimetric data (chroma C* according to CIELab, see DIN 6174) of multi-layer coatings prepared with the waterborne base coats.

TABLE 4

| Constituents: | Waterborne base coats 11 | | | | | | |
|---|---|---|---|---|---|---|---|
| | a*) | b**) | c**) | d**) | e**) | f**) | g**) |
| Binder dispersion of Example 8 | 15.5 | 15.5 | 15.5 | 15.5 | 15.5 | 15.5 | 15.5 |

TABLE 4-continued

| Constituents: | Waterborne base coats 11 | | | | | | |
|---|---|---|---|---|---|---|---|
| | a*) | b**) | c**) | d**) | e**) | f**) | g**) |
| Deionized water | 10 | 10 | 10 | 10 | 10 | 10 | 10 |
| Aqueous binder latex of Example 1 | 12 | — | — | — | — | — | — |
| Aqueous binder latex of Example 2 | — | 12 | — | — | — | — | — |
| Aqueous binder latex of Example 3 | — | — | 12 | — | — | — | — |
| Aqueous binder latex of Example 4 | — | — | — | 12 | — | — | — |
| Aqueous binder latex of Example 5 | — | — | — | — | 12 | — | — |
| Aqueous binder latex of Example 6 | — | — | — | — | — | 12 | — |
| Aqueous binder latex of Example 7 | — | — | — | — | — | — | 12 |
| Deionized water | 10 | 10 | 10 | 10 | 10 | 10 | 10 |
| Cymel ® 325 | 4.5 | 4.5 | 4.5 | 4.5 | 4.5 | 4.5 | 4.5 |
| Deionized water | 12.5 | 12.5 | 12.5 | 12.5 | 12.5 | 12.5 | 12.5 |
| Thickener[1] | 7 | 7 | 7 | 7 | 7 | 7 | 7 |
| DMEA, 10 wt. % solution in water | 3.5 | 3.5 | 3.5 | 3.5 | 3.5 | 3.5 | 3.5 |
| Surfynol ® 104 (50 wt. % in BE) | 1.5 | 1.5 | 1.5 | 1.5 | 1.5 | 1.5 | 1.5 |
| BE | 10 | 10 | 10 | 10 | 10 | 10 | 10 |
| Mica Slurry[2] | 11 | 11 | 11 | 11 | 11 | 11 | 11 |
| Carbon Black Dispersion[3] | 3 | 3 | 3 | 3 | 3 | 3 | 3 |
| Chroma C* 15°(units)[4] | 34.3 | 34.5 | 34.4 | 34.5 | 34.7 | 36.1 | 36.4 |

*)comparative example
**)according to the invention
[1]Mixture of 33 pbw Viscalex HV 30 from Allied Colloids, 2.5 pbw DMEA and 64.5 pbw of deionized water.
[2]Mixture of 40 pbw Iriodin ® 9221 SW from Merck, 10 pbw BE and 40 pbw deionized water.
[3]Mixture of 15 pbw carbon black, 10 pbw of a nonionic surfactant, 22 pbw DMEA and 53 pbw deionized water.
[4]The water-borne base coats were each applied to steel test panels provided with a precoating consisting of EDC primer and primer surfacer in 16 μm dry film thickness. After flashing-off for 5 minutes at 20° C. and additional 5 minutes at 80° C. the test panels were each spray coated with a commercial two-component polyurethane clear coat in 40 μm dry film thickness and after flashing-off for 5 minutes at 20° C. baked for 20 minutes at 140° C. object temperature.
The chroma C* at an illumination angle of 45 degrees to the perpendicular and an observation angle of 15 degrees to the specular was measured with the instrument X-Rite MA 68 sold by the firm X-Rite Incorporated, Grandeville, Michigan, U.S.A. (illumination with standard illuminant D65).

What is claimed is:

1. A process for the production of aqueous binder latices by multistage emulsion polymerization in the aqueous phase, comprising the successive steps:
1) free-radical polymerization of a mixture A of olefinically unsaturated, free-radically polymerizable monomers, comprising at least one olefinically monounsaturated monomer with at least one acid group in a proportion corresponding to an acid value of mixture A of 10 to 100 mg of KOH/g and 0.5 to 5 wt. % of at least one olefinically polyunsaturated monomer, in the aqueous phase,
2) neutralization of acid groups of the polymer formed in process step 1) and
3) free-radical polymerization of at least one mixture B of olefinically unsaturated, free-radically polymerizable monomers, comprising at least one olefinically monounsaturated monomer with at least one acid group in a proportion corresponding to an acid value of mixture B or each of the mixtures B of 0 to below 5 mg of KOH/g, at least one olefinically monounsaturated monomer with at least one hydroxyl group in a proportion corresponding to a hydroxyl value of mixture B or each of the mixtures B of 0 to below 5 mg of KOH/g and at least one olefinically polyunsaturated monomer in a proportion of 0.5 to 5 wt. %, relative to mixture B or each of the mixtures B, in the presence of the product obtained in process step 2),
wherein the monomer composition of mixtures A and B is selected in such a manner that the calculated glass transition temperature (Tg) of a copolymer composed of a combination of only the olefinically monounsaturated monomers of mixtures A and B is in the range from 30 to 100° C., wherein the ratio by weight of mixture A to the at least one mixture B is from 15:85 to 85:15 and wherein neutralization is not begun in process step 2) until at least 90 wt. % of the monomers of mixture A have been polymerized to completion.

2. The process of claim 1, wherein mixture A comprises at least one olefinically monounsaturated, free-radically polymerizable monomer with at least one hydroxyl group in a proportion corresponding to a hydroxyl value of mixture A of below 60 mg of KOH/g.

3. The process of claim 1, wherein mixture A and/or the at least one mixture B comprise at least one epoxy-functional, olefinically monounsaturated, free-radically polymerizable monomer in a total proportion of 2 to 20 wt. % relative to the sum of the weights of mixtures A and B.

4. The process of claim 1, wherein mixture A and/or the at least one mixture B comprise at least one olefinically monounsaturated, free-radically polymerizable monomer having at least one aromatic hydrocarbon moiety in the molecule, wherein said at least one olefinically monounsaturated, free-radically polymerizable monomer having at least one aromatic hydrocarbon moiety in the molecule constitutes 10 to 50 wt. % of the sum of the weights of mixtures A and B.

5. The process of claim 1, wherein mixture A and/or the at least one mixture B comprise at least one epoxy-functional, olefinically monounsaturated, free-radically polymerizable monomer in a total proportion of 2 to 20 wt. %, relative to the sum of the weights of mixtures A and B, whereas at the same time mixture A and/or the at least one mixture B comprise at least one olefinically monounsaturated, free-radically polymerizable monomer having at least one aromatic hydrocarbon moiety in the molecule, wherein said at least one olefinically monounsaturated, free-radically polymerizable monomer having at least one aromatic hydrocarbon moiety in the molecule constitutes 10 to 50 wt. % of the sum of the weights of mixtures A and B.

6. The process of claim 3, wherein the at least one epoxy-functional, olefinically monounsaturated, free-radically polymerizable monomer is glycidyl (meth)acrylate.

7. The process of claim 4, wherein the at least one olefinically monounsaturated, free-radically polymerizable monomer having at least one aromatic hydrocarbon moiety in the molecule is styrene.

8. The process of claim 1, wherein only one mixture B is used.

9. Aqueous binder latex produced by the process of claim 1.

10. An aqueous coating composition produced using an aqueous binder latex of claim 9 as binder.

11. A process for the production of base coat/clear coat two-layer coatings using an aqueous coating composition of claim 10 as water-borne base coat.

* * * * *